United States Patent
Chen et al.

(10) Patent No.: US 10,911,582 B2
(45) Date of Patent: *Feb. 2, 2021

(54) PRE-HIGH-EFFICIENCY (HE)-SHORT TRAINING FIELD PREAMBLE TRANSMISSION FOR THE HE-TRIGGER BASED PHYSICAL LAYER CONVERGENCE PROTOCOL (PLCP) PROTOCOL DATA UNIT (PPDU)

(71) Applicant: Intel IP Corporation, Santa Clara, CA (US)

(72) Inventors: Xiaogang Chen, Portland, OR (US);
Laurent Cariou, Portland, OR (US);
Qinghua Li, San Ramon, CA (US);
Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,145

(22) Filed: Jan. 2, 2019

(65) Prior Publication Data
US 2019/0149640 A1     May 16, 2019

Related U.S. Application Data

(63) Continuation of application No. 15/386,916, filed on Dec. 21, 2016, now Pat. No. 10,200,514.
(Continued)

(51) Int. Cl.
*H04L 29/06* (2006.01)
*H04L 29/08* (2006.01)
(Continued)

(52) U.S. Cl.
CPC ............ *H04L 69/324* (2013.01); *H04L 69/22* (2013.01); *H04W 74/06* (2013.01); *H04L 69/323* (2013.01);
(Continued)

(58) Field of Classification Search
CPC ..... H04L 69/22; H04L 69/323; H04L 69/324; H04W 72/04; H04W 84/12; H04W 88/08
See application file for complete search history.

(56) References Cited

U.S. PATENT DOCUMENTS 7,876,871 B2 * 1/2011 Zhang ................... H03L 7/1976
375/327
8,768,268 B2 * 7/2014 Mo ........................ H03B 19/00
455/313
(Continued)

OTHER PUBLICATIONS

"U.S. Appl. No. 15/386,916, Examiner Interview Summary dated Jul. 16, 2018", 3 pgs.
(Continued)

*Primary Examiner* — Alpus Hsu
(74) *Attorney, Agent, or Firm* — Schwegman Lundberg & Woessner, P.A.

(57) ABSTRACT

Embodiments of an access point (AP) may comprise memory and processing circuitry coupled to the memory, and transceiver circuitry coupled to the processing circuitry. The processing circuitry of the AP may be configured to encode a trigger frame to allocate a center 26 tone RU of an 80 MHz channel for an HE-trigger-based PPDU, the center 26 tone RU having an adjacent upper 20 MHz subchannel and an adjacent lower 20 MHz subchannel. In an embodiment, the center 26 tone RU is for a station (STA) and wherein the trigger frame indicates to the STA to transmit a pre-HE-STF preamble on one of the adjacent upper 20 MHz subchannel, the adjacent lower 20 MHz subchannel, or both the adjacent upper and lower 20 MHz subchannels, and configure the wireless device to transmit the trigger frame to the station.

20 Claims, 8 Drawing Sheets

Related U.S. Application Data

(60) Provisional application No. 62/356,029, filed on Jun. 29, 2016.

(51) Int. Cl.
  *H04W 72/04*  (2009.01)
  *H04W 74/06*  (2009.01)
  *H04W 84/12*  (2009.01)
  *H04W 88/08*  (2009.01)
  *H04W 74/00*  (2009.01)

(52) U.S. Cl.
  CPC .......... *H04W 74/006* (2013.01); *H04W 84/12* (2013.01); *H04W 88/08* (2013.01)

(56) References Cited

U.S. PATENT DOCUMENTS

| | | | |
|---|---|---|---|
| 9,628,310 B2 | 4/2017 | Lee et al. | |
| 9,641,234 B2 | 5/2017 | Moon et al. | |
| 9,673,943 B2 | 6/2017 | Seok | |
| 9,763,238 B2 | 9/2017 | Ghosh et al. | |
| 9,794,044 B2 * | 10/2017 | Sun | H04L 5/0037 |
| 9,867,189 B2 | 1/2018 | Lee et al. | |
| 10,027,449 B2 * | 7/2018 | Sun | H04L 27/2602 |
| 10,057,806 B2 * | 8/2018 | Hedayat | H04W 72/1284 |
| 10,178,634 B2 * | 1/2019 | Huang | H04W 56/0005 |
| 10,178,694 B2 * | 1/2019 | Ghosh | H04W 72/0453 |
| 10,200,514 B2 | 2/2019 | Chen et al. | |
| 10,201,017 B2 * | 2/2019 | Sun | H04W 74/08 |
| 10,219,271 B1 * | 2/2019 | Hedayat | H04W 72/0446 |
| 10,375,679 B2 * | 8/2019 | Chu | H04W 4/06 |
| 10,405,338 B2 * | 9/2019 | Chun | H04W 72/1284 |
| 2016/0080122 A1 | 3/2016 | Oh et al. | |
| 2016/0165589 A1 | 6/2016 | Chu et al. | |
| 2016/0174200 A1 | 6/2016 | Seok | |
| 2016/0286551 A1 | 9/2016 | Lee et al. | |
| 2016/0295513 A1 | 10/2016 | Moon et al. | |
| 2016/0353414 A1 | 12/2016 | Choi et al. | |
| 2016/0360443 A1 | 12/2016 | Hedayat | |
| 2016/0366254 A1 | 12/2016 | Asterjadhi et al. | |
| 2017/0006608 A1 | 1/2017 | Josiam et al. | |
| 2017/0041929 A1 | 2/2017 | Noh et al. | |
| 2017/0048048 A1 | 2/2017 | Seok | |
| 2017/0048862 A1 | 2/2017 | Choi et al. | |
| 2017/0063509 A1 | 3/2017 | Kim et al. | |
| 2017/0078915 A1 | 3/2017 | Sun et al. | |
| 2017/0079071 A1 | 3/2017 | Zhou et al. | |
| 2017/0094664 A1 | 3/2017 | Lee et al. | |
| 2017/0127269 A1 | 5/2017 | Ryu et al. | |
| 2017/0156148 A1 | 6/2017 | Park et al. | |
| 2017/0163394 A1 | 6/2017 | Choi et al. | |
| 2017/0171860 A1 | 6/2017 | Park et al. | |
| 2017/0181136 A1 | 6/2017 | Bharadwaj et al. | |
| 2017/0208580 A1 | 7/2017 | Park et al. | |
| 2017/0230963 A1 | 8/2017 | Park et al. | |
| 2017/0280452 A1 | 9/2017 | Choi et al. | |
| 2017/0288838 A1 | 10/2017 | Cariou et al. | |
| 2017/0288846 A1 | 10/2017 | Park et al. | |
| 2017/0289933 A1 * | 10/2017 | Segev | H04W 56/001 |
| 2017/0290060 A1 | 10/2017 | Kim et al. | |
| 2017/0303208 A1 | 10/2017 | Suh et al. | |
| 2017/0303268 A1 | 10/2017 | Ghosh et al. | |
| 2017/0303280 A1 | 10/2017 | Chun et al. | |
| 2017/0310506 A1 | 10/2017 | Park et al. | |
| 2017/0318518 A1 | 11/2017 | Kim et al. | |
| 2017/0338910 A1 | 11/2017 | Chun et al. | |
| 2017/0338919 A1 | 11/2017 | Lim et al. | |
| 2017/0339692 A1 | 11/2017 | Chun et al. | |
| 2017/0359158 A1 * | 12/2017 | Lim | H04W 72/048 |
| 2017/0359812 A1 | 12/2017 | Park et al. | |
| 2017/0373806 A1 | 12/2017 | Choi et al. | |
| 2017/0374684 A1 * | 12/2017 | Ghosh | H04L 5/0007 |
| 2018/0007179 A1 | 1/2018 | Chen et al. | |
| 2018/0007661 A1 | 1/2018 | Chun et al. | |
| 2018/0091347 A1 | 3/2018 | Lee et al. | |
| 2018/0242355 A1 * | 8/2018 | Lou | H04W 72/121 |

OTHER PUBLICATIONS

"U.S. Appl. No. 15/386,916, Non Final Office Action dated May 18, 2018", 12 pgs.

"U.S. Appl. No. 15/386,916, Notice of Allowance dated Sep. 27, 2018", 7 pgs.

"U.S. Appl. No. 15/386,916, Response filed Jul. 25, 2018 to Non Final Office Action dated May 18, 2018", 13 pgs.

* cited by examiner

PRE-HIGH-EFFICIENCY (HE)-SHORT TRAINING FIELD PREAMBLE TRANSMISSION FOR THE HE-TRIGGER BASED PHYSICAL LAYER CONVERGENCE PROTOCOL (PLCP) PROTOCOL DATA UNIT (PPDU)

PRIORITY CLAIM

This application is a continuation of U.S. patent application Ser. No. 15/386,916, filed Dec. 21, 2016, now issued as U.S. Pat. No. 10,200,514, which claims priority under 35 USC 119(e) to U.S. Provisional Patent Application Ser. No. 62/356,029, filed Jun. 29, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for pre-high-efficiency (HE)- short training field (STF) preamble transmissions for an HE-trigger based physical layer convergence protocol (PLCP) protocol data unit (PPDU).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
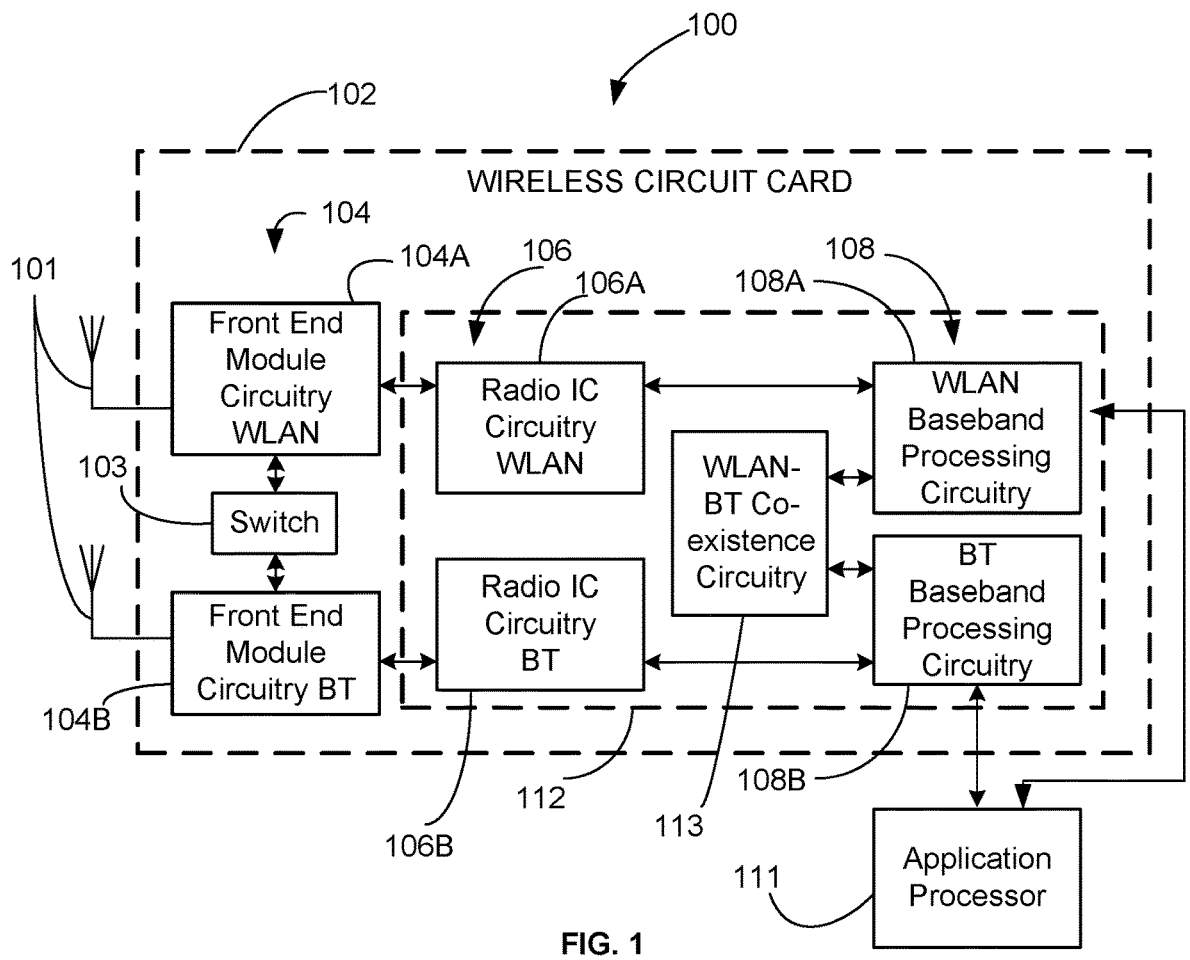
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
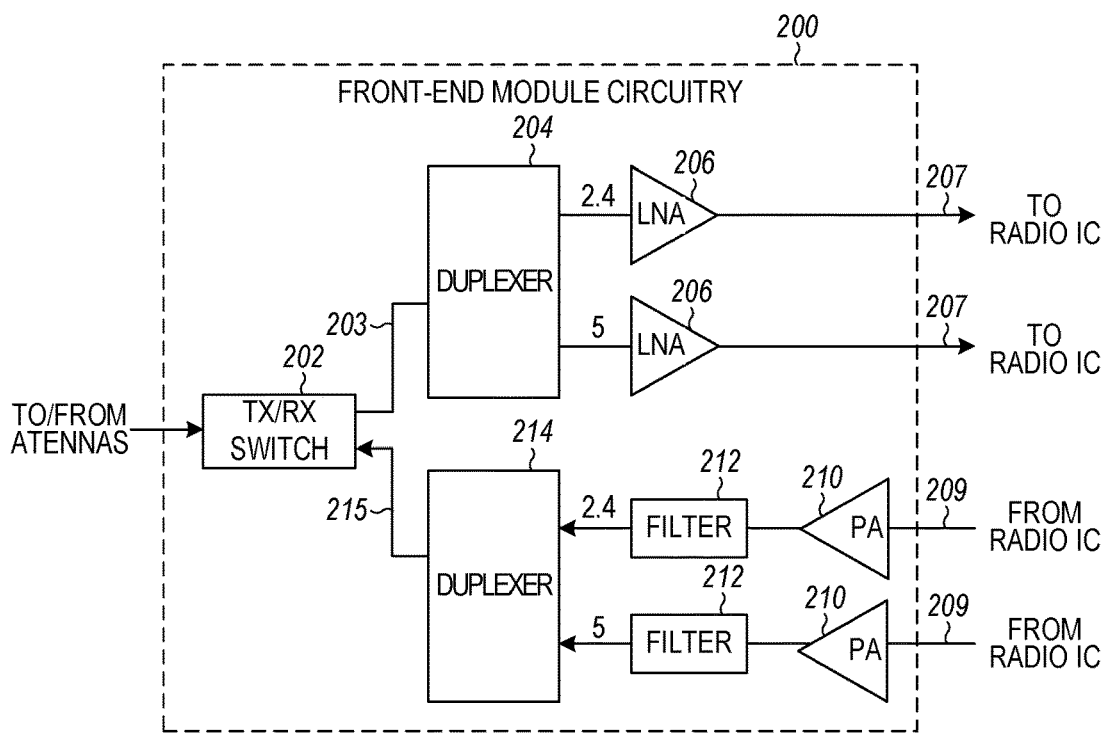
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
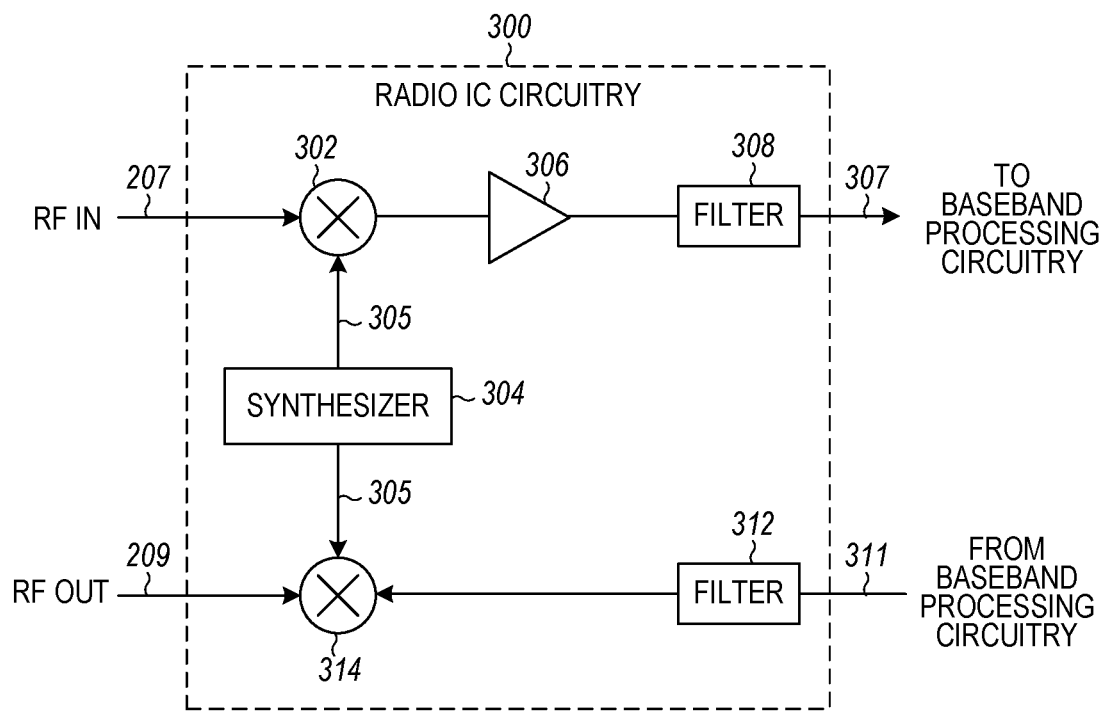
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
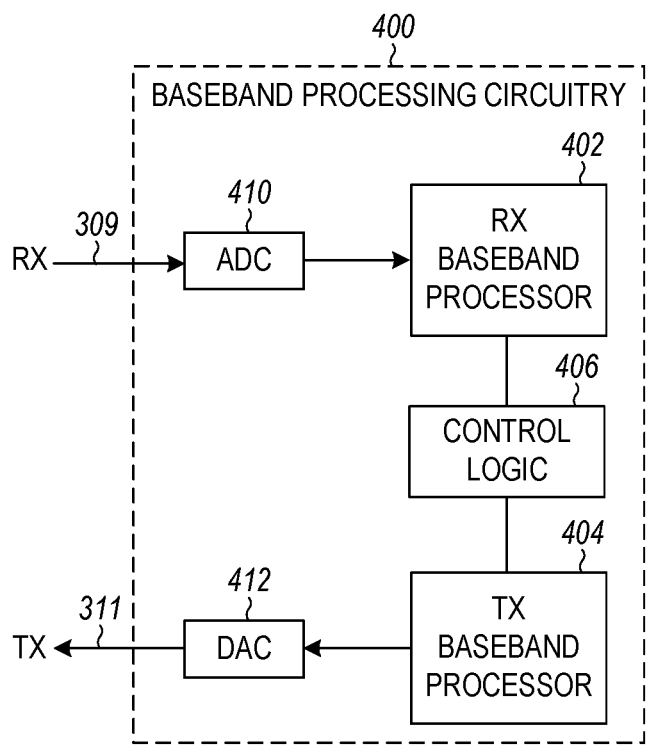
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
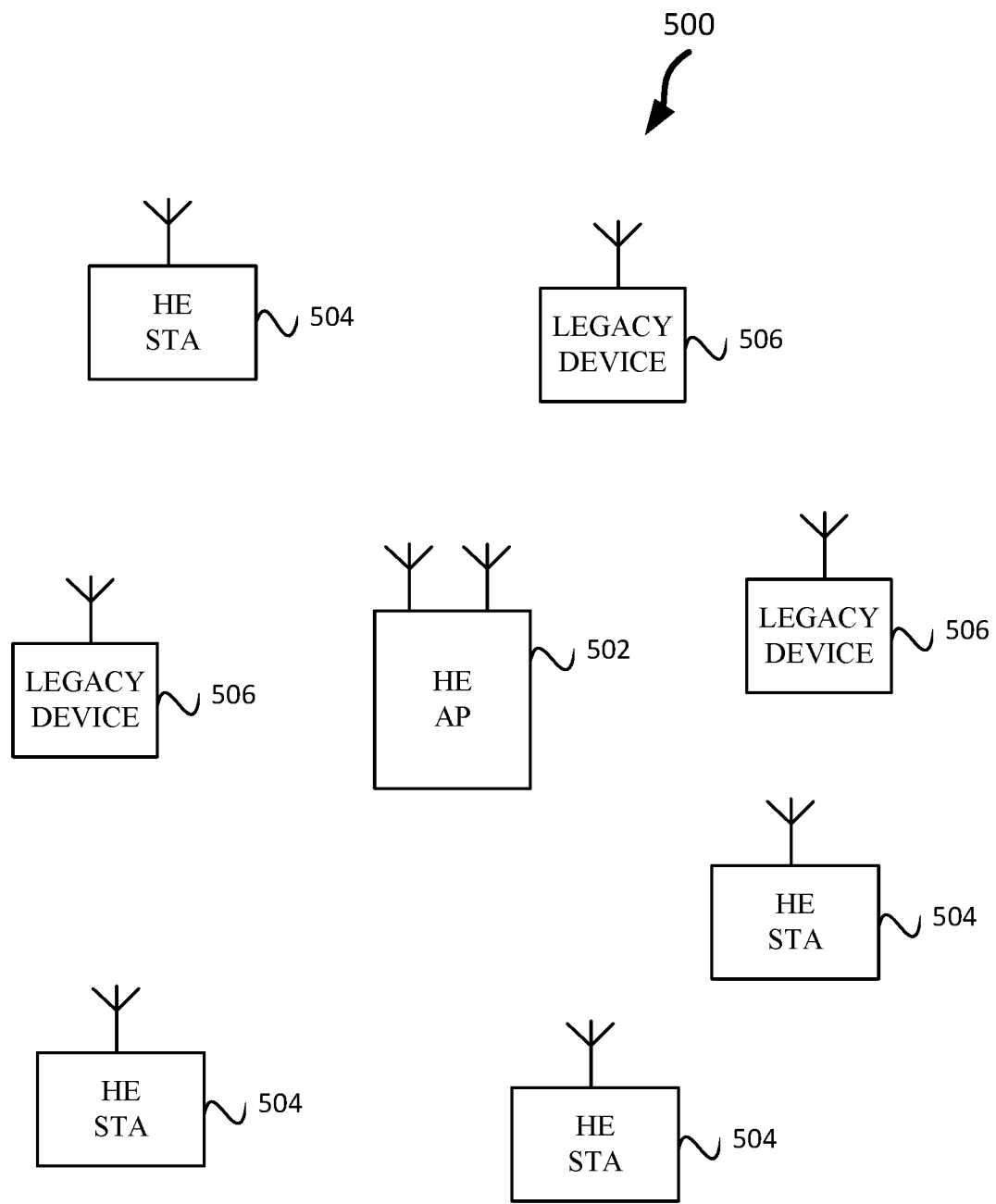
FIG. 5 illustrates a WLAN in accordance with some embodiments.

FIG. 5 illustrates a WLAN in accordance with some embodiments. The WLAN may comprise a basis service set (BSS) 500 that may include a master station 502, which may be an AP, a plurality of high-efficiency (HE) (e.g., IEEE 802.11ax) stations 504, and a plurality of legacy (e.g., IEEE 802.11 n/ac) devices 506.

The master station 502 may be an AP using one of the IEEE 802.11 protocols to transmit and receive. The master station 502 may be a base station. The master station 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 502 and/or HE station 504 may use one or both of MU-MIMO and OFDMA. There may be more than one master station 502 that is part of an extended service set (ESS). A controller (not illustrated) may store information that is common to the more than one master station 502. The controller may have access to an external network such as the Internet.

The legacy devices 506 may operate in accordance with one or more of IEEE 802.11 a/b/g/n/ac/ad/af/ah/aj, or another legacy wireless communication standard. The legacy devices 506 may be STAs or IEEE 802.11 STAs. The HE stations 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 504, master station 502, and/or legacy devices 506 may be termed wireless devices. In some embodiments the HE station 504 may be a "group owner" (GO) for peer-to-peer modes of operation where the HE station 504 may perform some operations of a master station 502.

The master station 502 may communicate with legacy devices 506 in accordance with legacy IEEE 802.11 communication techniques. In example embodiments, the master station 502 may also be configured to communicate with HE stations 504 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used. In some embodiments, the OFDMA structure consists of a 26-subcarrier resource unit (RU), 52-subcarrier RU, 106-subcarrier RU, 242-subcarrier RU, 484-subcarrier RU and 996-subcarrier RU. Resource allocations for single user (SU) consist of a 242 subcarrier RU, 484-subcarrier RU, 996-subcarrier RU and 2×996-subcarrier RU.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 502, HE station 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 502 may operate as a master station which may be arranged to contend for a wireless medium (e.g., during a contention period) to receive exclusive control of the medium for an HE control period. In some embodiments, the HE control period may be termed a transmission opportunity (TXOP). The master station 502 may transmit a HE master-sync transmission, which may be a trigger frame or HE control and schedule transmission, at the beginning of the HE control period. The master station 502 may transmit a time duration of the TXOP and channel information. During the HE control period, HE stations 504 may communicate with the master station 502 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 502 may communicate with HE stations 504 using one or more HE frames. During the HE control period, the HE STAs 504 may operate on a channel smaller than the operating range of the master station 502. During the HE control period, legacy stations refrain from communicating.

In accordance with some embodiments, during the master-sync transmission the HE STAs 504 may contend for the wireless medium with the legacy devices 506 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 504 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 504 and/or the master station 502 are configured to perform the methods and operations herein described in conjunction with FIGS. 5-11. As used below, a master station may be an Access Point (AP) and may be used interchangeably herein.

Figure 5A:
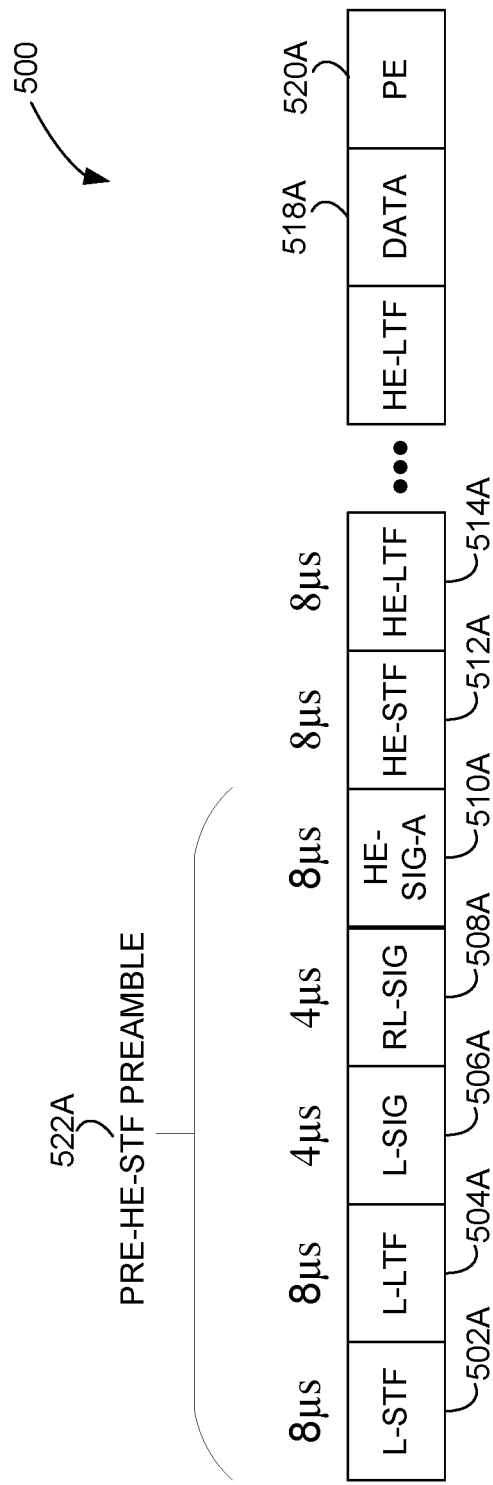
FIG. 5A illustrates a HE trigger-based PPDU in accordance with some embodiments.

FIG. 5A illustrates a HE trigger-based PPDU 500A operable in some embodiments which may include L-STF 502A, L-LTF 504A, L-SIG 506A, RL-SIG 508A, HE-SIG-A 510A, HE Training Symbols HE-STF 512A, HE-LTF 514A, HE- LTF 516A, Data 518A Packet extension (if present) 520A, and pre-HE-STF preamble 522A.

In an embodiment, the description below includes WiFi HE physical layer topics. In some example embodiments, an objective of IEEE 802.11ax is in the master station PPDU which may include a trigger frame and in response to the trigger frame, the HE trigger-based PPDU 500A, which may include the pre-HE-STF preamble, which includes legacy preamble, RL-SIG 508a and HE-SIG-A 510a, is sent only on the 20 MHz channels where the HE modulated fields are located. When the HE modulated fields are located in more than one 20 MHz channel, the pre-HE-STF preamble shall be duplicated over the multiple 20 MHz channels. The pre-HE-STF preamble 522A may include L-STF 502A, L-LTF 504A, L-SIG 506A, RL-SIG 508A, and HE-SIG-A 510A.

In some embodiments, if an AP 502 schedules a STA 504 to transmit only on the center 26 tone RU, the preamble can be transmitted in accordance with several options described below. In an example embodiment, if the working bandwidth includes 80 MHz and the AP allocates the center 26 tone RU in 80 MHz for the HE-trigger-based PPDU, several rules are defined below for the pre-HE-STF preamble transmission.

Figure 6:
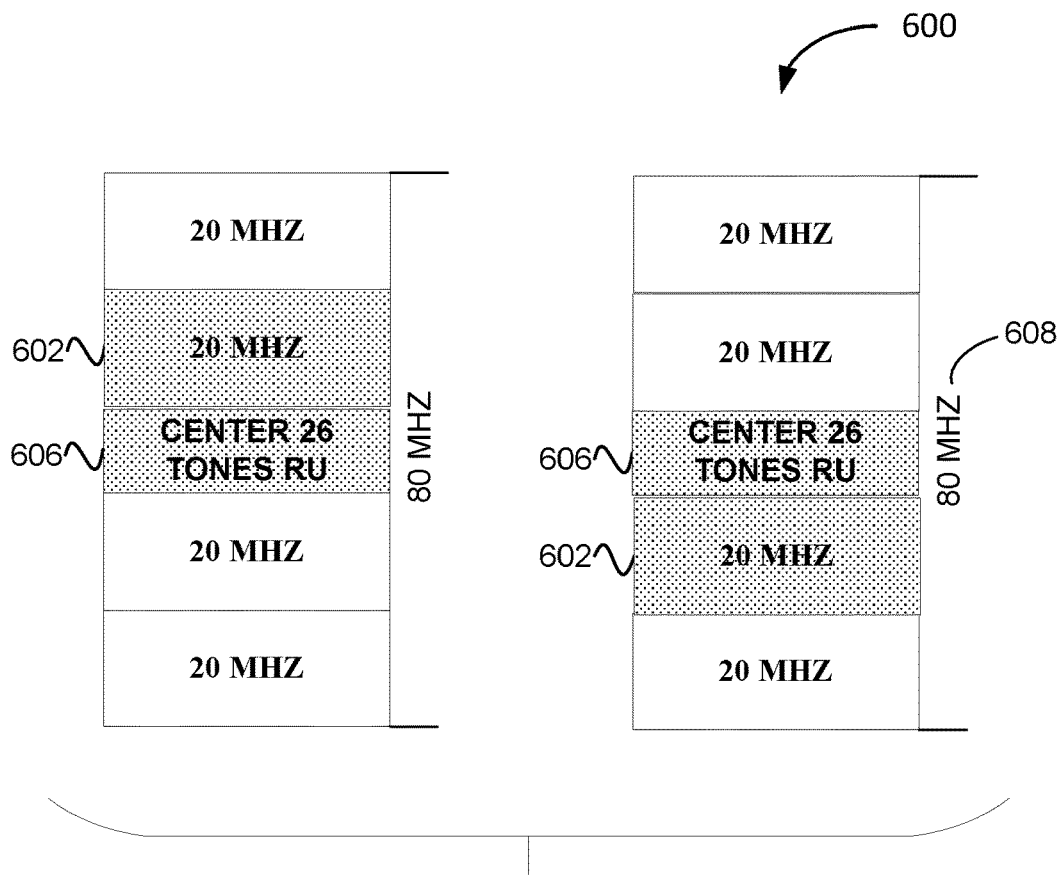
FIG. 6 illustrates a chart showing a pre-HE-STF preamble transmitted only on one adjacent 20 MHz, in accordance with some embodiments.

In some embodiments, if the working bandwidth is 80 MHz and AP 502 allocates the center 26 tone RU 606 of FIG. 6 in 80 MHz for an HE-trigger-based PPDU 500A, the pre-HE-STF preamble, which includes the legacy preamble (L-SIG) 506A, repeat legacy signal field (RL-SIG) 508A and HE-SIG-A (high-efficiency signal field A) 510A, is sent on the 20 MHz channel(s) following these embodiments:

Embodiment I: Transmit the pre-HE-STF preamble on one of the adjacent 20 MHz in 80 MHz bandwidth. FIG. 6 illustrates a chart 600 showing transmitting the pre-HE-STF preamble on only one of the adjacent 20 MHz subchannels in the 80 MHz bandwidth 608. In an embodiment it should be specified which adjacent 20 MHz is used: the upper 20 MHz 602 or lower 20 MHz 604. Since only one 20 MHz is used for the preamble transmission, this option minimizes the interference to neighboring BSS.

Figure 7:
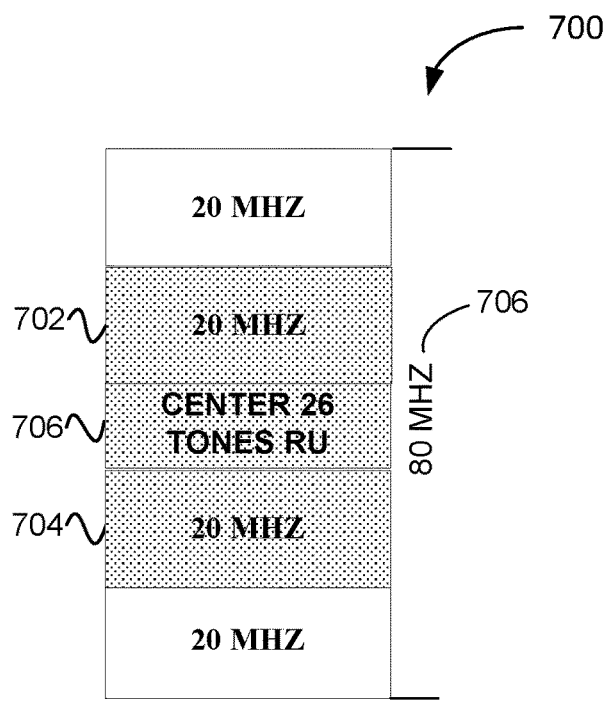
FIG. 7 illustrates a chart showing a pre-HE-STF preamble transmitted on both of the adjacent 20 MHz subchannels in the 80 MHz bandwidth, in accordance with some embodiments.

Embodiment II: FIG. 7 illustrates a chart 700 showing a pre-HE-STF preamble transmitted on both of the adjacent 20 MHz subchannels in the 80 MHz bandwidth, in accordance with some embodiments.

Embodiment III: AP 502 is not to schedule a STA which transmit only on the center 26 tone RU. In this example embodiment, the AP 502 is prevented from scheduling a STA to transmit an HE-Trigger-based PPDU only on the center 26 tone RU.

In some embodiments, the abovementioned options apply to the HE-trigger-based PPDU 500A scheduled on the center 26 tone RU 80 MHz bandwidth, 80 MHz+80 MHz, and 160 MHz bandwidth.

Figure 8:
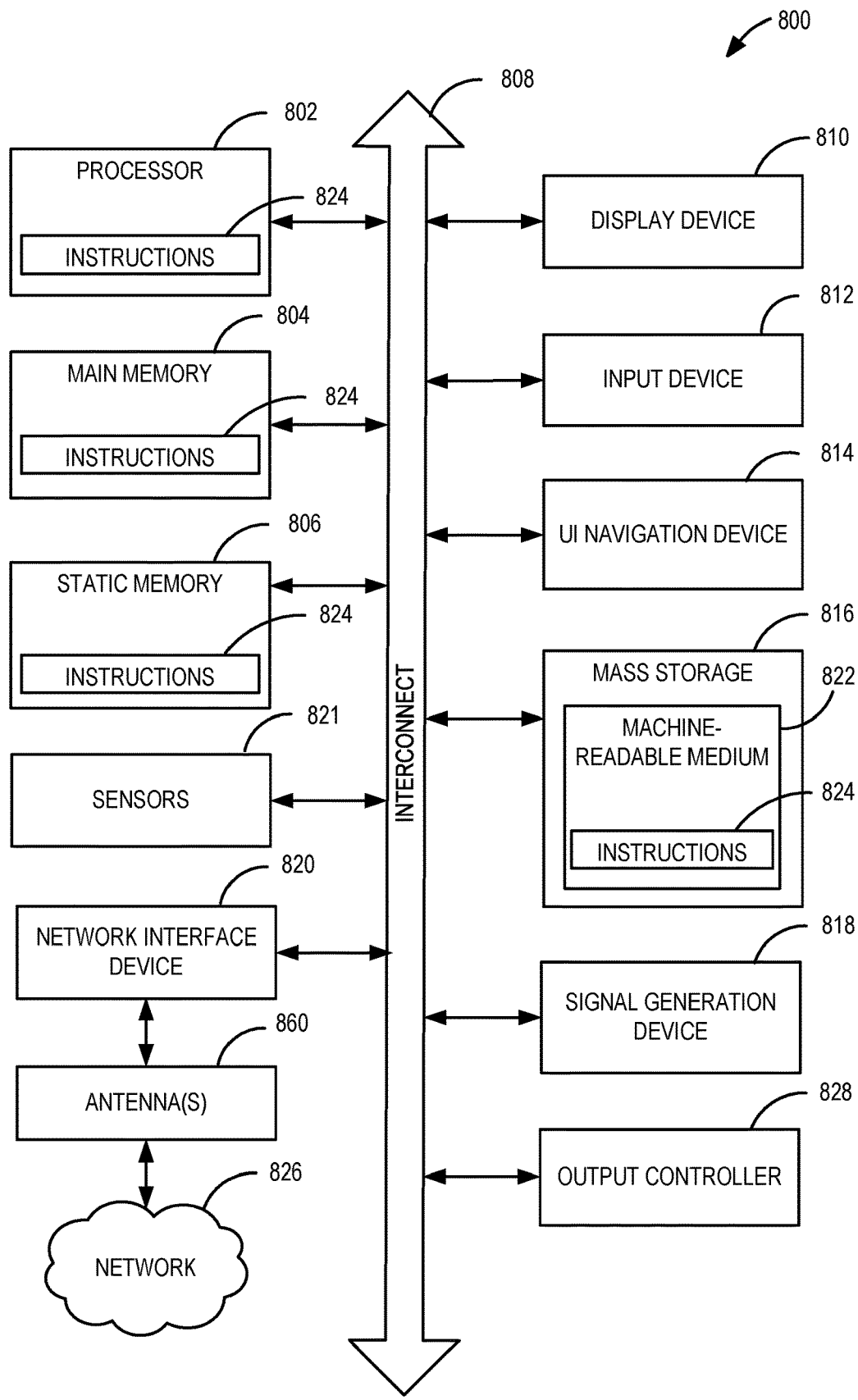
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. The machine 800 may incorporate all or some of the radio architecture illustrated in FIGS. 1-4. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 502, HE station 504, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Figure 9:
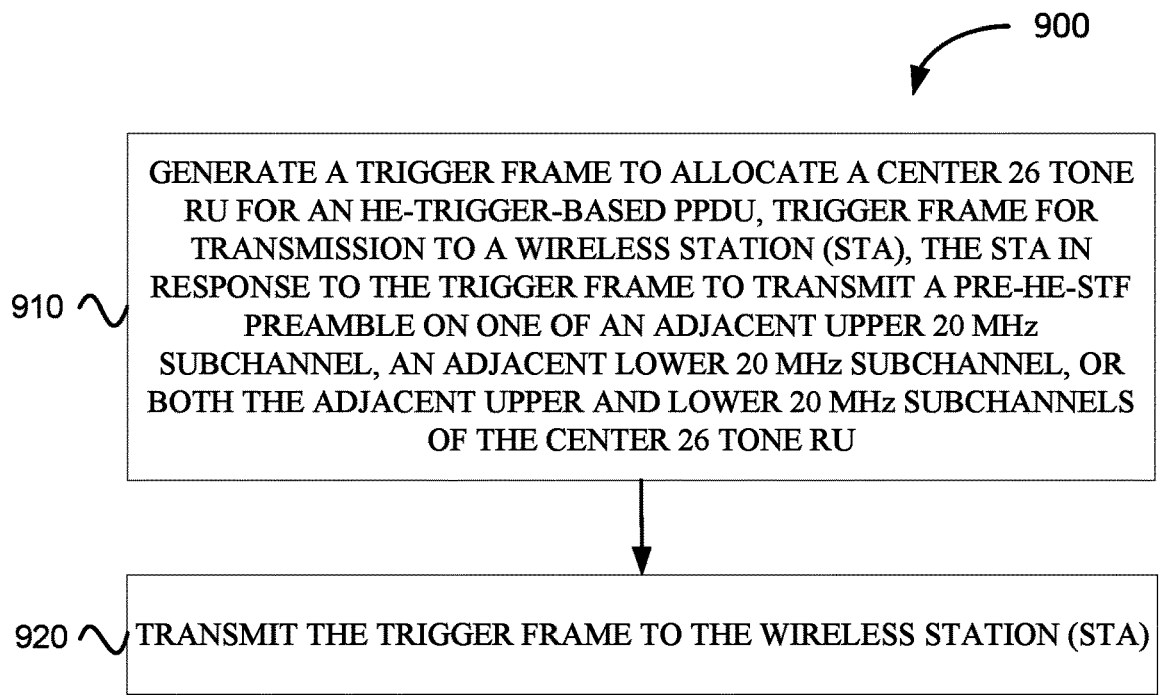
FIG. 9 illustrates a method performed by an AP in accordance with some embodiments.

FIG. 9 at 900 illustrates an embodiment of a method performed by the AP 502. At 910, the AP 502 may generate a trigger frame to allocate a center 26 tone RU 606 for an HE-trigger-based PPDU 500A, the trigger frame may be for transmission to a wireless station (STA) 504. The STA 504 in response to the trigger frame may transmit a pre-HE-STF preamble (which may include RL-SIG 508a and HE-SIG-A 510a) on one of an adjacent upper 20 MHz subchannel 602, an adjacent lower 20 MHz subchannel 604, or both the adjacent upper and lower (FIG. 7) 20 MHz subchannels of the center 26 tone RU. At 920 the AP 502 may transmit the trigger frame to the STA.

Figure 10:
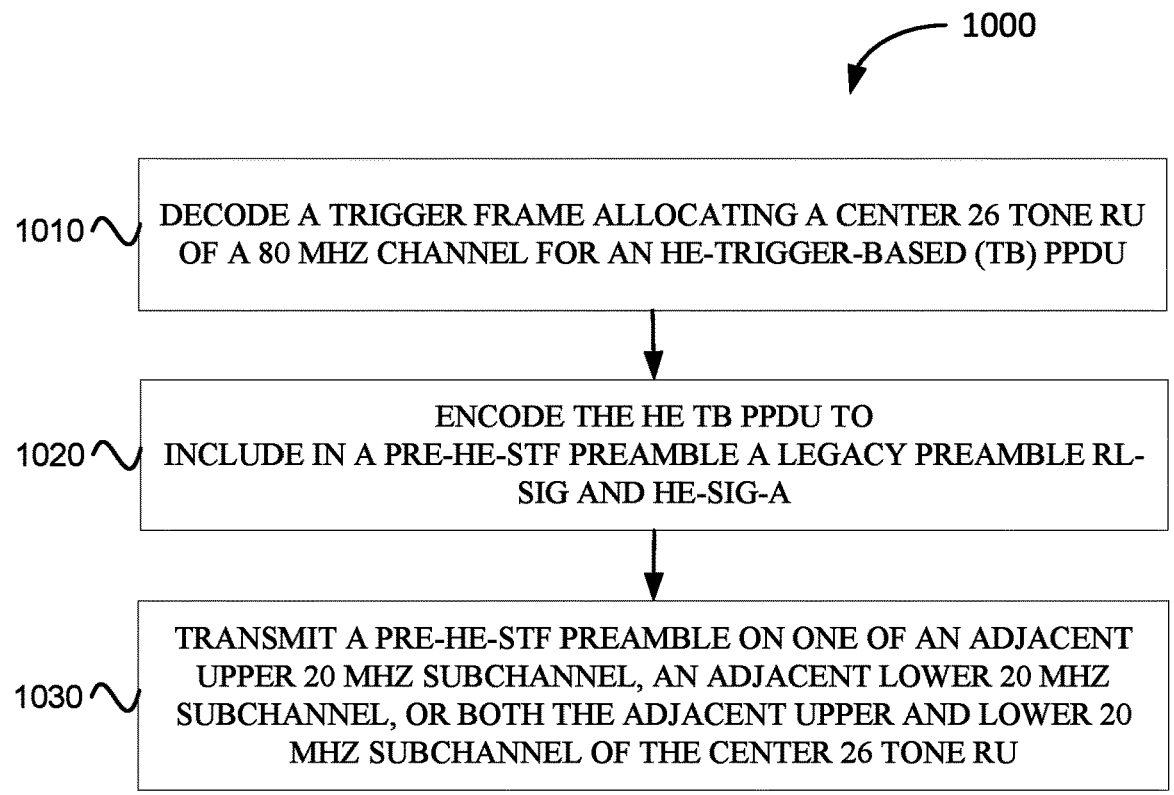
FIG. 10 illustrates a method performed by a STA in accordance with some embodiments.

FIG. 10 at 1000 illustrates an embodiment of a method performed by the STA 504. At 1010 the STA 504 may decode a trigger frame allocating a center 26 tone RU of a 80 MHz channel for an HE-trigger-based PPDU 500A. At 1020, in response to the trigger frame, the STA 504 may encode the HE TB PPDU to include in the pre-HE-STF preamble a legacy preamble RL-SIG 508a and HE-SIG-A 510a. At 1030 the STA may transmit a pre-HE-STF preamble on one of an adjacent upper 20 MHz subchannel 602, an adjacent lower 20 MHz subchannel 604, or both the adjacent upper and lower (FIG. 7) 20 704 MHz subchannels of the center 26 tone RU respectively.

Figure 11:
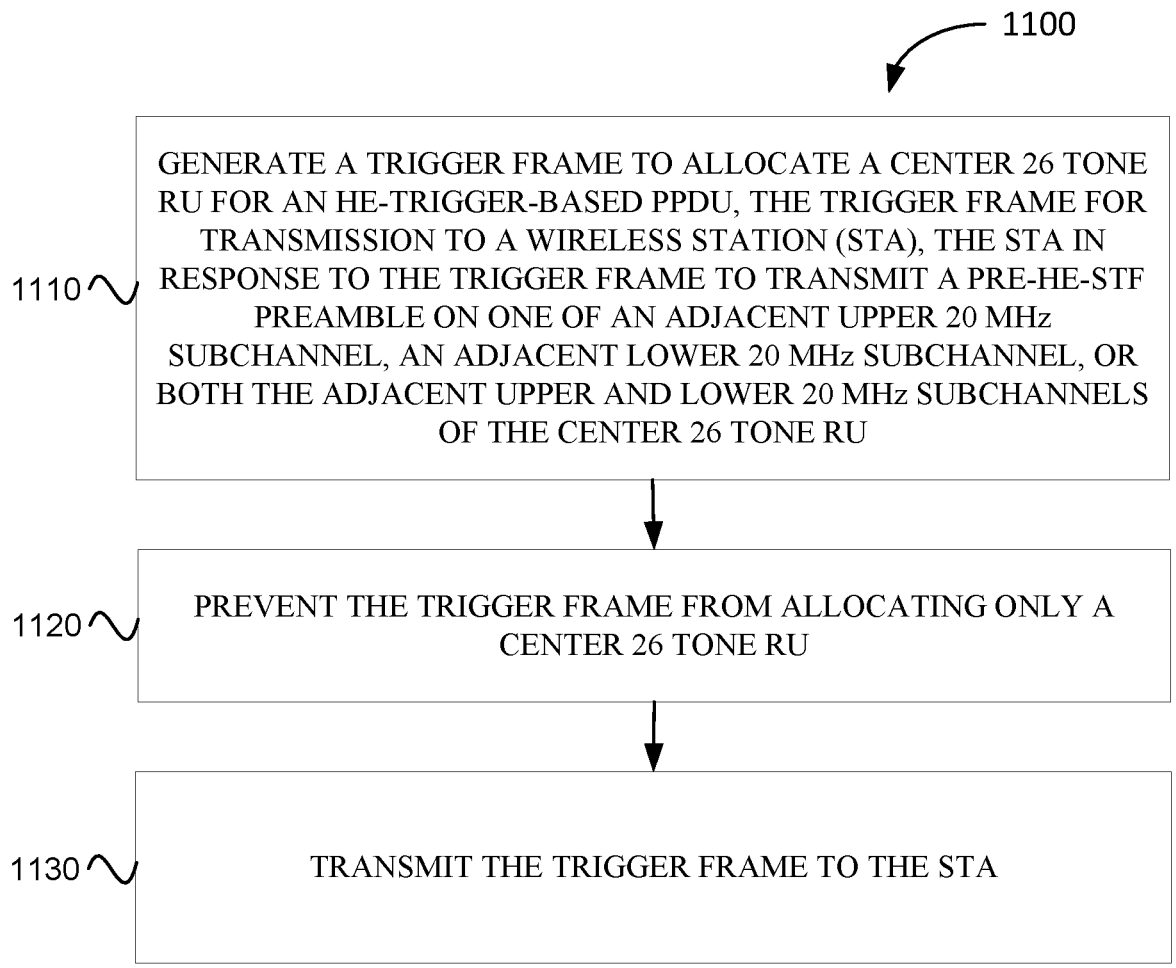
FIG. 11 illustrates a method performed by an AP in accordance with some embodiments.

FIG. 11 at 1100 illustrates an embodiment wherein the AP 502 may simply prevent the trigger frame from allocating only a center 26 tone RU of a 80 MHz channel for an HE-trigger-based PPDU 500A. In this embodiment, the AP 502 may still allocate a center 26 tone, but it just may not make this the only tone allocated. In the Example of FIG. 11, at 1110, AP 502 may generate a trigger frame to allocate a center 26 tone RU for an HE-Trigger-Based PPDU, the trigger frame for transmission to a wireless station (STA) 504. The STA 504 in response to the trigger frame, to transmit a Pre-HE-STF-Preamble on one of an adjacent upper 20 MHz subchannel, an adjacent lower 20 MHz subchannel, or both the adjacent upper and lower 20 MHz subchannels of the center 26 tone. At 1120 of this embodiment, the AP prevents the trigger frame from allocating only a center 26 tone RU for an HE-Trigger-Based PPDU. At 1130, the AP 502 may transmit the trigger frame to the STA.

Figure 12:
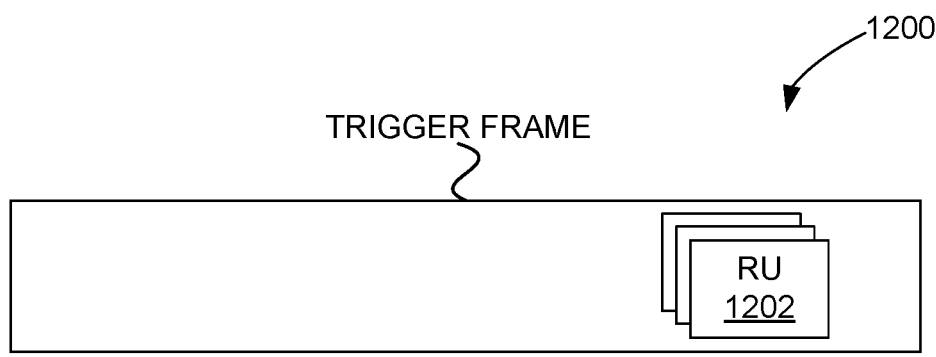
FIG. 12 illustrates a trigger frame in accordance with some embodiments.

FIG. 12 illustrates a trigger frame 1200. The trigger frame 1200 may comprises RUs 1202 for stations to transmit UL HE TB PPDUs. In some embodiments, an RU 1202 may indicate a center 26 tone RU.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

In Example 1, an apparatus of a wireless device may comprise memory. The apparatus may further comprise processing circuitry coupled to the memory. The processing circuitry may be configured to generate a trigger frame to allocate a center 26 tone RU for an HE-trigger-based PPDU, the center 26 tone RU having an adjacent upper 20 MHz subchannel and an adjacent lower 20 MHz subchannel. In an embodiment the center 26 tone RU is for a station (STA) and wherein the trigger frame indicates to the STA to transmit a pre-HE-STF preamble on one of the adjacent upper 20 MHz subchannel, the adjacent lower 20 MHz subchannel, or both the adjacent upper and lower 20 MHz subchannels, and configure the wireless device to transmit the trigger frame to the station.

In Example 2, the subject matter of Example 1, wherein the processing circuitry is further configured to decode the pre-HE-STF preamble, received from the STA, on one of the adjacent upper 20 MHz subchannel, the adjacent lower 20 MHz subchannel, or both the adjacent upper and lower 20 MHz subchannels.

In Example 3, the subject matter of one or any combination of Examples 1-2, wherein a working bandwidth of the wireless device is 80 MHz.

In Example 4, the subject matter of one or any combination of Examples 1-3 wherein the pre-HE-STF preamble includes a legacy preamble RL-SIG and HE-SIG-A.

In Example 5, the subject matter of one or any combination of Examples 1-4, wherein the wireless device and the one or more stations may be one from the following group: an Institute of Electrical and Electronic Engineers (IEEE) 802.11ax access point, an IEEE 802.11ax station, an IEEE 802.11 station, and an IEEE 802.11 access point.

In Example 6, the subject matter of one or any combination of Examples 1-5, further comprising transceiver circuitry coupled to the processing circuitry.

In Example 7, the subject matter of one or any combination of Examples 1-6 further comprising one or more antennas coupled to the transceiver circuitry.

In Example 8, the subject matter of one or any combination of Examples 1-7, wherein the processing circuitry is further configured to prevent the generation of a trigger frame to allocate only a center 26 tone RU for an HE-trigger based PPDU.

In Example 9, a non-transitory computer-readable storage medium that stores instructions for execution by one or more processors, the instructions to configure the one or more processors to cause a wireless device to generate a trigger frame to allocate a center 26 tone RU for an HE-trigger-based PPDU, the center 26 tone RU having an adjacent upper 20 MHz subchannel and an adjacent lower 20 MHz subchannel. In an embodiment the center 26 tone RU is for a station (STA) and wherein the trigger frame indicates to the STA to transmit a pre-HE-STF preamble on one of the adjacent upper 20 MHz subchannel, the adjacent lower 20 MHz subchannel, or both the adjacent upper and lower 20 MHz subchannels. The instructions may further configure the wireless device to transmit the trigger frame to the station.

In Example 10, the subject matter of Example 9 wherein the HE-trigger-based PPDU is scheduled on the center 26 tone RU of 80 MHz bandwidth, or 80 MHz+80 MHz bandwidth or 160 MHz bandwidth.

In Example 11, the subject matter of one or any combination of Examples 9-10 wherein a working bandwidth of the wireless device is 80 MHz.

In Example 12, the subject matter of one or any combination of Examples 9-11 wherein the pre-HE-STF preamble may include a legacy preamble RL-SIG and HE-SIG-A.

In Example 13, an apparatus of a station comprising memory; and processing circuitry coupled to the memory, the processing circuitry configured to decode a trigger frame. The trigger frame may allocate a center 26 tone RU for an HE-trigger-based PPDU, the center 26 tone RU having an adjacent upper 20 MHz subchannel and an adjacent lower 20 MHz subchannel. The processing circuitry may further configure the station to transmit a pre-HE-STF preamble on one of the adjacent upper 20 MHz subchannel, the adjacent lower 20 MHz subchannel, or both the adjacent upper and lower 20 MHz subchannels.

In Example 14, the subject matter Example 13 further comprising transceiver circuitry coupled to the processing circuitry.

In Example 15, the subject matter of one or any combination of Examples 13-14, further comprising one or more antennas coupled to the transceiver circuitry.

In Example 16, the subject matter of one or any combination of Examples 13-14, wherein the wireless device is one of an Institute of Electrical and Electronic Engineering (IEEE) 802.11ax station or 802.11 station.

In Example 17, a method performed by a wireless device, comprising generating a trigger frame to allocate a center 26 tone RU for an HE-trigger-based PPDU, the center 26 tone RU having an adjacent upper 20 MHz subchannel and an adjacent lower 20 MHz subchannel. The center 26 tone RU may be for a station (STA) and the station may transmit a pre-HE-STF preamble on one of the adjacent upper 20 MHz subchannel, the adjacent lower 20 MHz subchannel, or both the adjacent upper and lower 20 MHz subchannels. The method may further comprise configuring the wireless device to transmit the trigger frame to the station.

In Example 18, the subject matter of Example 17 wherein a working bandwidth of the wireless device is 80 MHz.

In Example 19, the subject matter of one or any combination of Examples 17-18 further comprising including in the pre-HE-STF preamble a legacy preamble RL-SIG and HE-SIG-A.

In Example 20, the subject matter of one or any combination of Examples 17-19, further comprising using transceiver circuitry coupled to the processing circuitry to transmit the trigger frame to the station.

In Example 21, the subject matter of one or any combination of Examples 17-20 further comprising using one or more antennas coupled to the transceiver circuitry to transmit the trigger frame to the station.

In Example 22, the subject matter of one or any combination of Examples 17-21, further comprising configuring the processing circuitry to prevent the generation of a trigger frame that allocates only a center 26 tone RU for an HE-trigger based PPDU.

In Example 23, a method performed by a station, comprising decoding a trigger frame. The trigger frame may allocate a center 26 tone RU for an HE-trigger-based PPDU, the center 26 tone RU having an adjacent upper 20 MHz subchannel and an adjacent lower 20 MHz subchannel. The method may configure the station to transmit a pre-HE-STF preamble on one of the adjacent upper 20 MHz subchannel, the adjacent lower 20 MHz subchannel, or both the adjacent upper and lower 20 MHz subchannels.

In Example 24, the method of example 23, further comprising using transceiver circuitry coupled to the processing circuitry to transmit the HE-trigger-based PPDU.

In Example 25, the subject matter of one or any combination of Examples 23-24, further comprising one or more antennas coupled to the transceiver circuitry to transmit the HE-trigger-based PPDU.

In Example 26, the subject matter of one or any combination of Examples 23-25, wherein the wireless device is one of an Institute of Electrical and Electronic Engineering (IEEE) 802.11ax station or 802.11 station.

In Example 27, the subject matter of one or any combination of Examples 23-26, wherein the trigger frame is received from an access point (AP) operating in a wireless local area network (WLAN).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA) comprising memory; and processing circuitry coupled to the memory, the processing circuitry configured to:
   decode a trigger frame from an access point (AP), wherein the trigger frame allocates a center 26-tone resource unit (RU) of an 80 MHz bandwidth for the STA to transmit a high-efficiency (HE) trigger-based (TB) physical layer (PHY) protocol data unit (PPDU), and wherein an upper 20 MHz subchannel and a lower 20 MHz subchannel include a portion of the center 26-tone RU; and
   configure the STA to transmit the HE TB PPDU comprising pre-HE-short training field (STF) preamble fields duplicated on the upper 20 MHz subchannel and on the lower 20 MHz subchannel when HE-modulated fields are located in more than one 20 MHz channel.

2. The apparatus of claim 1, wherein the pre-HE-STF preamble fields comprise a legacy short training field (L-STF), a legacy long training field (LLTF), a legacy signal field (L-SIG), a repeated L-SIG (RL-SIG) and an HE signal A field (HE-SIGA).

3. The apparatus of claim 1, wherein
   the HE TB PPDU comprises the pre-HE-STF preamble fields duplicated on the upper 20 MHz subchannel and on the lower 20 MHz subchannel.

4. The apparatus of claim 3, wherein the HE TB PPDU further comprises HE modulated fields comprising a HE short training field (HE-STF), a HE long training field (HE-LTF) and a data field.

5. The apparatus of claim 3, wherein the HE TB PPDU is transmitted to the access point in response to the trigger frame.

6. The apparatus of claim 1, wherein the STA is a HE STA.

7. The apparatus of claim 1, wherein
   the HE TB PPDU comprises an HE portion on the center 26 tone RU of the 80 MHz bandwidth.

8. The apparatus of claim 1, wherein the trigger frame initiates uplink orthogonal frequency division multiple-access (OFDMA) transmissions.

9. The apparatus of claim 1, further comprising transceiver circuitry coupled to the processing circuitry.

10. The apparatus of claim 1, further comprising one or more antennas coupled to the transceiver circuitry.

11. The apparatus of claim 1, wherein the STA is one of an Institute of Electrical and Electronic Engineering (IEEE) 802.11ax station or IEEE 802.11 station.

12. The apparatus of claim 1 further comprising:
   mixer circuitry to downconvert radio frequency (RF) signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein N is an integer with a value of 1 or greater and
   wherein the processing circuitry is configured to decode the baseband signals, the baseband signals including the trigger frame.

13. The apparatus of claim 1 further comprising: mixer circuitry to downconvert radio frequency (RF) signals to baseband signals; and
   synthesizer circuitry, the synthesizer circuitry comprising a delta-sigma synthesizer, the synthesizer circuitry configured to generate an output frequency for use by the mixer circuitry,
   wherein the processing circuitry is configured to decode the baseband signals, the baseband signals including the trigger frame.

14. The apparatus of claim 1, further comprising transceiver circuitry coupled to the processing circuitry; and one or more antennas coupled to the transceiver circuitry.

15. A non-transitory computer-readable storage medium that stores instructions for execution by one or more processors of a station (STA), the instructions to configure the one or more processors to:
   decode a trigger frame from an access point (AP), wherein the trigger frame allocates a center 26-tone resource unit (RU) of an 80 MHz bandwidth for the STA to transmit a high-efficiency (HE) trigger-based (TB) physical layer (PHY) protocol data unit (PPDU), and wherein an upper 20 MHz subchannel and a lower 20 MHz subchannel include a portion of the center 26-tone RU; and
   configure the STA to transmit the HE TB PPDU comprising pre-HE-short training field (STF) preamble fields duplicated on the upper 20 MHz subchannel and on the lower 20 MHz subchannel when HE-modulated fields are located in more than one 20 MHz channel.

16. The non-transitory computer-readable storage medium of claim 15, wherein the pre-HE-STF preamble fields comprise a legacy short training field (L-STF), a legacy long training field (L-LTF), a legacy signal field (L-SIG), a repeated L-SIG (RL-SIG) and an HE signal A field (HE-SIG-A).

17. The non-transitory computer-readable storage medium of claim 15, wherein
   the HE TB PPDU comprises the pre-HE-STF preamble fields duplicated on the upper 20 MHz subchannel and on the lower 20 MHz subchannel.

18. An apparatus of an access point comprising memory; and processing circuitry coupled to the memory, the processing circuitry configured to:
   generate a trigger frame to allocate a center 26 tone resource unit (RU) of an 80 MHz channel for an high-efficiency (HE)-trigger-based (TB) physical layer (PHY) protocol data unit (PPDU), wherein an upper 20 MHz subchannel and a lower 20 MHz subchannel include a portion of the center 26-tone RU, wherein the center 26 tone RU is for a station (STA) and wherein the trigger frame indicates to the STA is to transmit pre-HE-short training field (STF) preamble fields duplicated on the upper 20 MHz subchannel and on the lower 20 MHz subchannel when HE-modulated fields are located in more than one 20 MHz channel; and configure the access point to transmit the trigger frame to the STA.

19. The apparatus of claim 18, wherein the trigger further indicates that the STA is to transmit the HE TB PPDU in response to the trigger frame, and wherein the HE TB PPDU is to comprise the pre-HE-short training field (STF) preamble fields duplicated on the upper 20 MHz subchannel and on the lower 20 MHz subchannel.

20. The apparatus of claim 19, wherein the trigger frame indicates the STA is to generate the HE TB PP DU with an HE portion on the center 26 tone RU of an 80 MHz bandwidth.

* * * * *